Figure 1A:
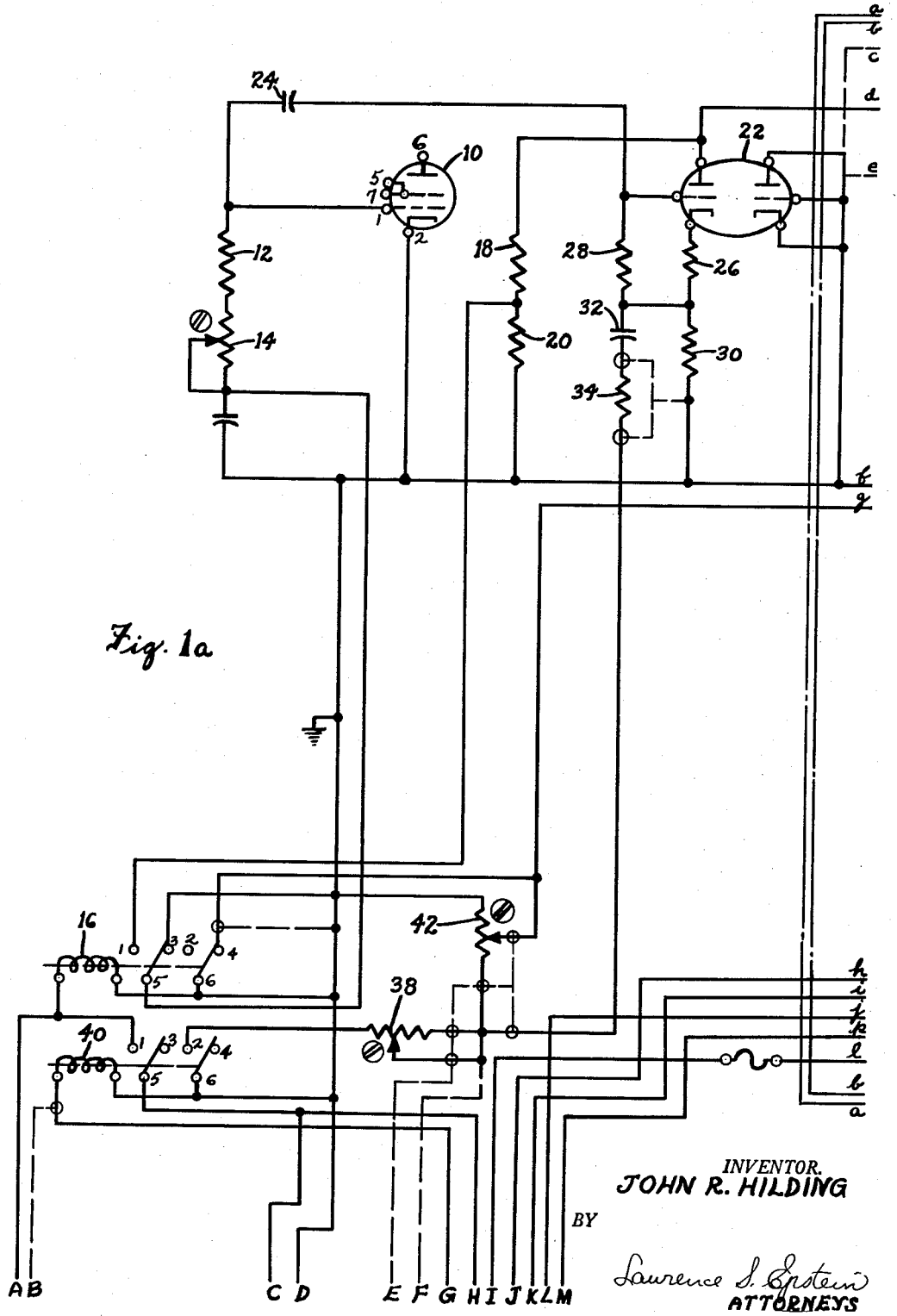
Figure 1B:
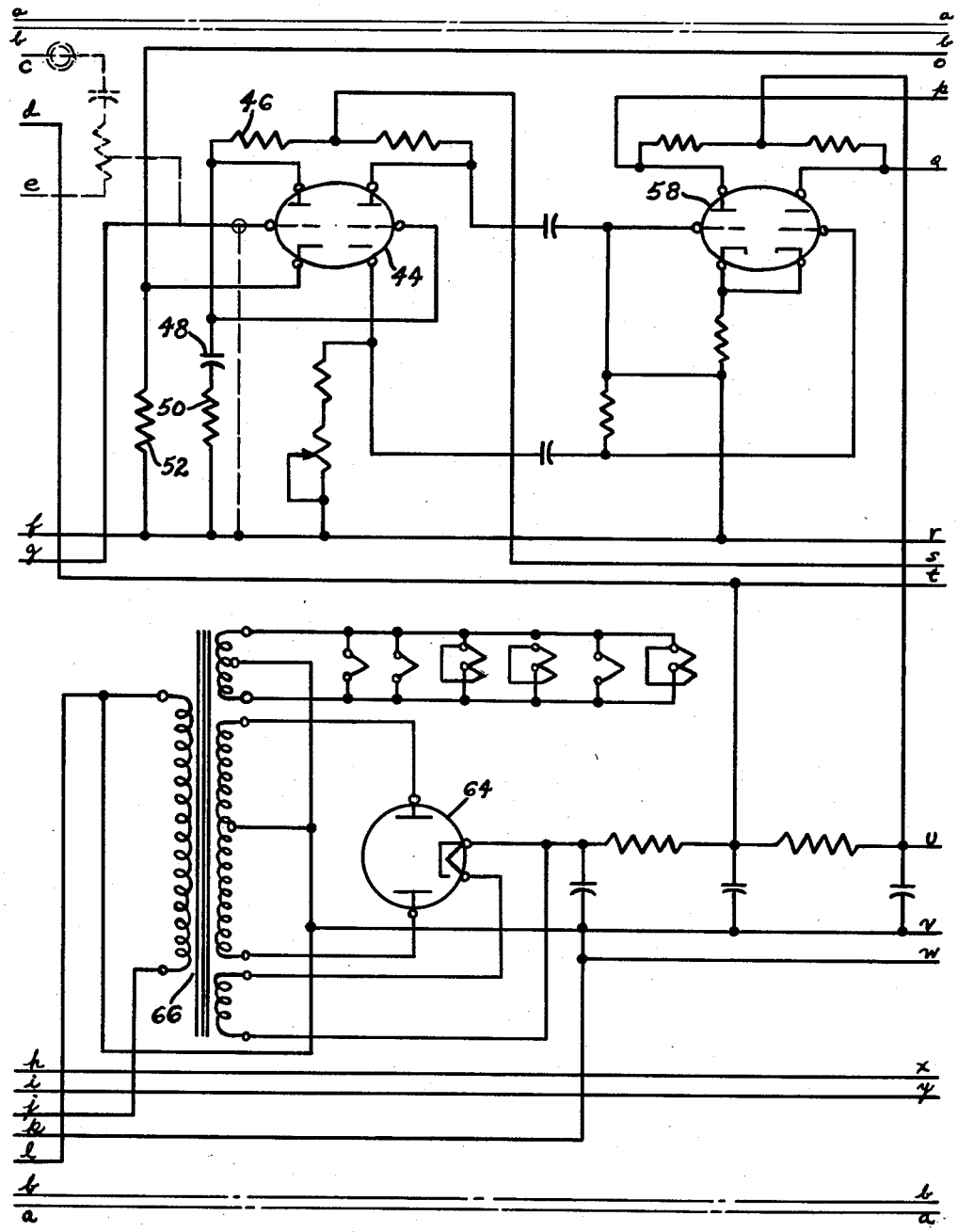
Figure 1C:
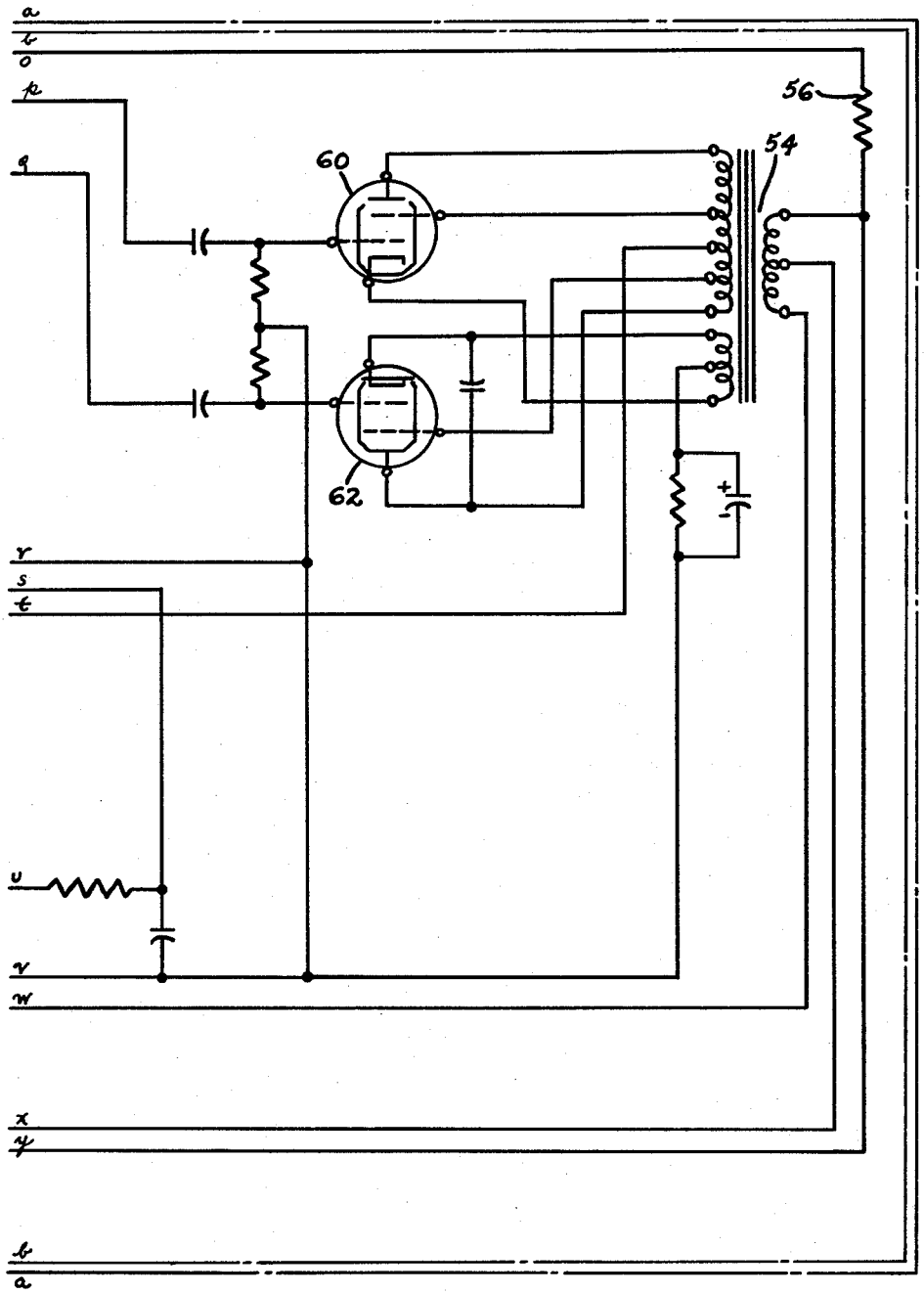
Figure 1D:
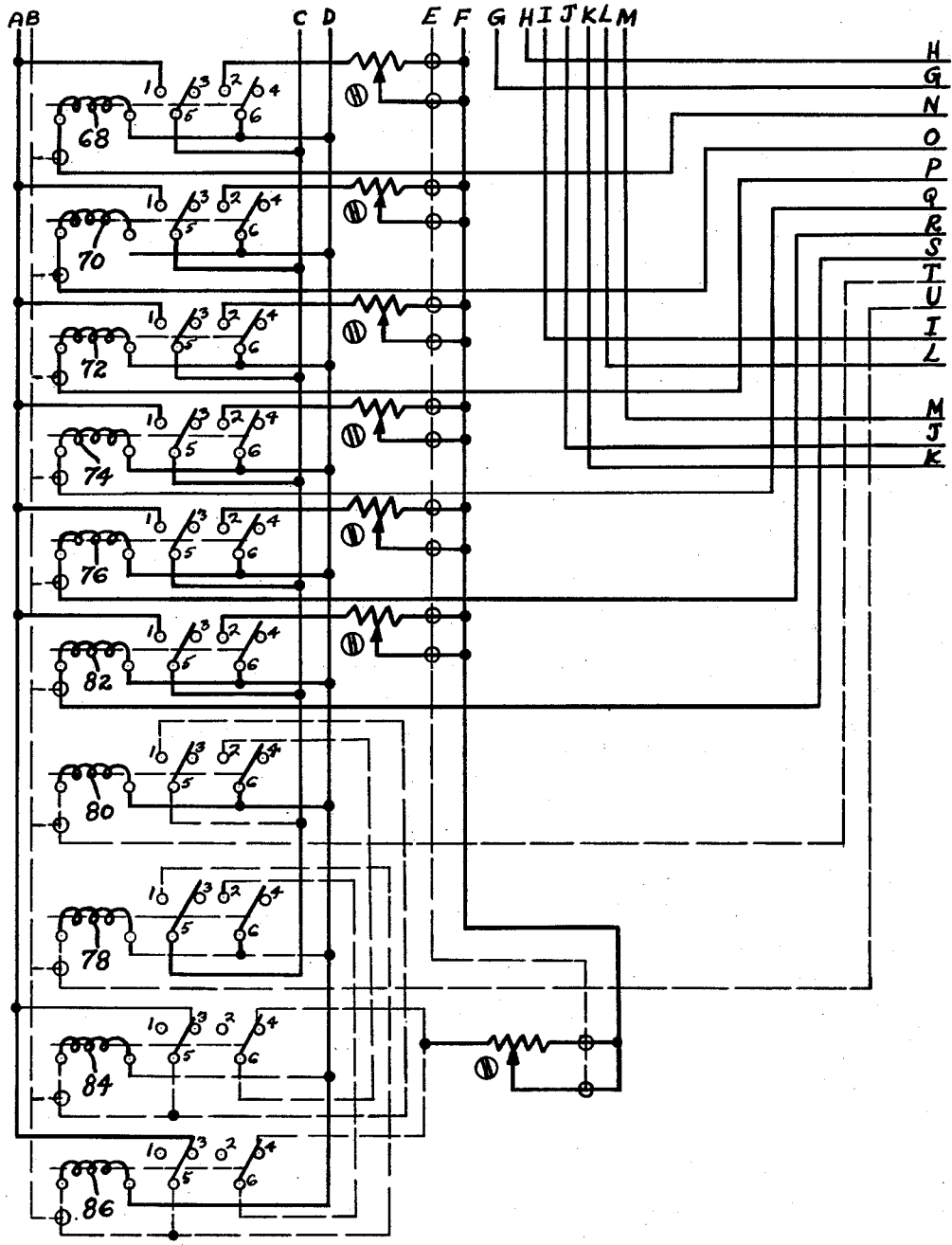
Figure 1E:
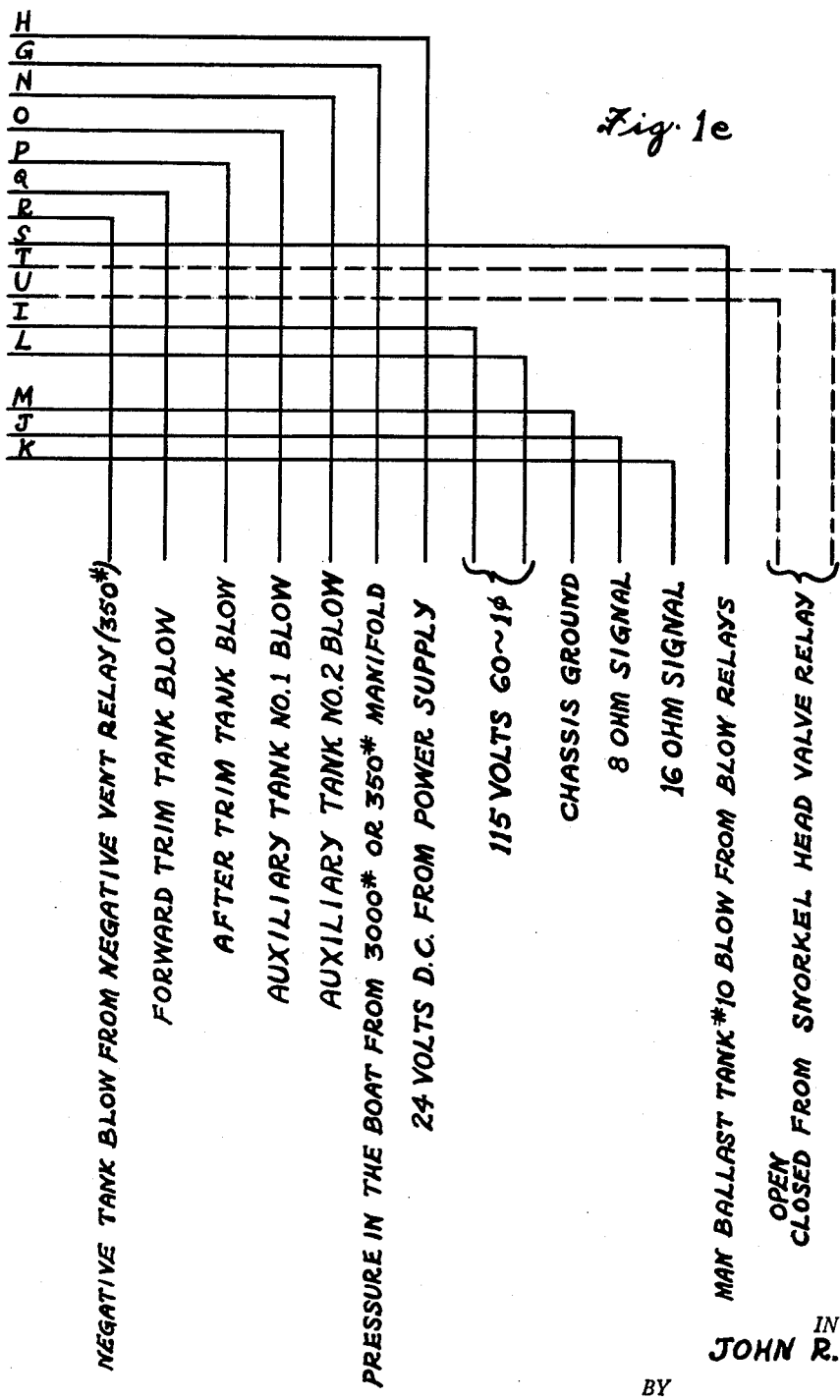

INVENTOR.
JOHN R. HILDING

INVENTOR.
JOHN R. HILDING
BY
Lawrence S. Epstein
ATTORNEYS

3,045,190
SOUND SIMULATOR UTILIZING NOISE SOURCE
John R. Hilding, Groton, Conn., assignor, by mesne assignments, to the United States of America as represented by the Secretary of the Navy
Filed Mar. 21, 1960, Ser. No. 16,619
7 Claims. (Cl. 331—78)

This invention relates to devices for simulating the noises encountered within a submarine during operation and is intended for use in conjunction with submarine training devices such as the universal submarine trainer which is a co-pending application of Herman E. Sheets et al., Serial No. 3,466, filed January 19, 1960. This noise simulator is utilized for the purpose of subjecting a trainee to the actual noises which he will encounter under normal operating conditions.

It is an object of this invention to provide an electrical apparatus for realistically simulating the noises encountered within a submarine during normal operation.

It is a further object to provide realistic simulation of noises encountered within a submarine, said noises occurring in conjunction with the operation of various controls just as these noises occur during the actual operation of the submarine.

Another object of the invention is to provide an improved sound simulation device to simulate the sound characteristics of high pressure air utilized aboard submarines.

A further object of the instant invention is to provide a light weight, flexible, low cost sound simulation system for submarine trainers.

Prior to the utilization of the instant invention, methods of providing sound simulation have used a pneumatic system involving air compressors, storage tanks and valves. These prior methods have the disadvantages of being bulky, lacking flexibility and having high cost. The instant invention is comparatively small, quite flexible (many different types of sound being able to be simulated), and the cost is quite low compared to a pneumatic system. In addition, the instant invention has the advantages of easily changed simulated sound output levels and easily changed simulated sound directivity by relocation of speakers. Further, by electrically interlinking the submarine controls with the control elements of the instant invention, sound effects are obtained which realistically correspond to the sound effects which would be obtained by manipulation of identical controls in actual submarine operation.

A more detailed description of the instant invention now follows with reference to the single drawing which shows an electrical schematic diagram of the instant invention.

With reference to the drawing, the invention comprises a conventional power supply, a conventional amplifier, a crossover network, two high fidelity speakers and a sound source.

The sound source in the preferred embodiment of the invention is a 2D21 thyratron 10. This thyratron is a gas tube. Gas tubes are inherently noisy because of the gas ionization. Plate and suppressor pins 6 and 7 respectively, of thyratron 10 are not connected. The cathode of thyratron 10 is connected to ground. The grid pin 1 of thyratron 10 is connected through grid resistors 12 and 14 to contact 5 of relay 16. When relay 16 is unenergized, contact 5 is connected to ground through contact 3 of this relay. When relay 16 is energized, contact 5 is connected to a positive voltage of approximately 100 volts at the intersection of resistors 18 and 20. Resistor 18 has its high side connected to the 440 volt output of the power supply circuitry.

In operation, when relay 16 is de-energized, thyratron 10 is inoperative and no noise signals are generated by this tube. When relay 16 is energized a high positive voltage is applied to the grid of the thyratron. This high positive voltage causes the gas within the tube to ionize and break down permitting a high current to flow between the cathode and grid of this tube 10. This current has a great deal of noise because of the gas ionization at the cathode of the tube. The current between grid and cathode of thyratron 10 is limited by the action of the current limiter tube 22. This tube 22 is a dual triode 12AU7 in the preferred embodiment. One-half of the tube is inoperative. The first half has its plate connected to 440 volts, its grid connected through capacitor 24 to the grid of noise generator thyratron 10 and its cathode connected to ground through a filter circuit which comprises resistor 26, resistor 28, resistor 30, capacitor 32 and resistor 34. Tube 22 acts to limit the current through the cathode-grid of thyratron 10 as follows: When the high positive voltage is applied to the grid of thyratron 10, the gas ionizes and high current flows between grid and cathode, a positive voltage step occurs which is applied through capacitor 24 to the grid of current limiter tube 22. This positive step causes a negative step to be generated at the plate of tube 22. This negative step reduces the positive voltage applied to the grid of thyratron tube 10 through resistor 18 from the 440 volt output of the power supply. Thus, the positive potential at the grid of thyratron 10 is reduced thereby regulating the current output at this grid. The noise associated with the current output at the grid of thyratron 10 is also applied through capacitor 24 and through a filter circuit comprising resistors 28, 26, 30, 34 and capacitor 32 through variable resistor 38 to contact 2 of relay 40. When relay 40 is de-energized, contact 2 is not connected. When relay 40 is energized, contact 2 is connected to ground through contact 6 of this relay. The noise signal filtered by the resistor-capacitor filter is applied through resistor 42 to the grid input of audio amplifier tube 44. If relay 16 is de-energized, the input to the grid of the first half of amplifier tube 44 is grounded through contacts 4–6 of this relay. If relay 16 is energized, this ground connection is removed and the filtered noise output of the thyratron tube 10 is applied to the grid of this amplifier tube 44. The variable resistor 42 is the grid resistor for the amplifier tube 44 and can be adjusted to vary the magnitude of the input and therefore the magnitude of the output level. The first half of amplifier tube 44 operates in a conventional class A manner to amplify the filtered noise signals applied to it. The first half of audio amplifier 44 is conventional in form with resistor 46 as a plate load and capacitor 48 and resistor 50 as a plate decoupling network. Resistor 52 is the cathode load for amplifier tube 44. Feedback voltage from the output transformer 54 is applied through resistor 56 to the cathode resistor 52 for improved frequency response. The output of the first half of tube 44 is applied to the second half of tube 44 which is a phase-splitter amplifier. This second half of tube 44 operates to split the phase of the noise signal for application to each of the driver tubes for the output power tubes, respectively the first and second halves of tube 58. The first and second halves of tube 58 amplify the noise signals which are 180 degrees out of phase with each other and respectively apply these out-of-phase signals to the output push-pull power tubes, 60 and 62 respectively. These output power tubes are connected in push-pull with transformer 54. The output of transformer 54 is the noise signals. These noise signals are applied to the speakers located within the submarine simulator. Full wave rectifier tube 64 and transformer 66 and the associated resistors and capacitors provide a power supply for the audio amplifier and noise generator.

The functions which are simulated are shown on the figure as inputs to the relays 40, 68, 70, 72, 74 and 76. Whenever an input signal is applied to any of these input relays the appropriate relay is energized and a 24-volt input through energized contacts of the energized relay energizes relay 16. The grid of the thyratron 10 then has a positive voltage. The noise signal of current limiter tube 22 is applied through contacts of relay 16 to the noise amplifier 44. The simulator then operates as explained supra.

Whenever snorkel head valve opening and closing signals are applied or the main power ballast tank blow signal is applied to relays 78, 80 and 82 respectively, operating voltage is applied to the coils of thermal delay relays 84 and 86 depending upon which relay, 80 or 82, is operative. After a time interval, the thermal time delay relays open thus de-energizing relay 16.

Obviously many modifications and variations of the present invention are possible in the light of the above teachings. It is therefore to be understood that within the scope of the appended claims the invention may be practiced otherwise than as specifically described.

What is claimed is:

1. In a device for simulating specific sounds in combination, a source of noise operatively connected to a filtering device for filtering out the desired sounds, and amplifying means for amplifying desired sounds and relay control means operatively connected to said noise and said amplifying means for controlling the occurrence of said desired sounds, whereby actuation of said relay turns said noise source on and deactuation of said relay turns said noise source off.

2. The combination of claim 1 wherein said noise means comprise electronic noise generation means, said filter means comprise resistors and capacitors and said amplifying means comprise electronic means.

3. The combination of claim 2 wherein said electronic noise means is a gas tube.

4. The combination of claim 3 wherein said gas tube is operated as a diode.

5. The combination of claim 4 wherein said amplifying means comprise an audio amplifier having two amplifier stages operatively connected in series with a phase-splitting stage, said phase-splitting stage operatively connected to two driver stages, said driver stages respectively connected to two output stages operating in push-pull.

6. The combination of claim 5 wherein said noise generating means is controlled by relay means operatively connected thereto.

7. In a device for simulating specific sounds in combination, a source of noise operatively connected to a filtering device for filtering out the desired sounds, amplifying means for amplifying said desired sounds and relay control means operatively connected to said noise and said amplifying means for controlling the occurrence of said desired sounds whereby actuation of said relay turns said noise source on and deactuation of said relay turns said noise source off, and current limiting means operatively connected to said noise source whereby the current flowing through said noise source is limited.

References Cited in the file of this patent

UNITED STATES PATENTS

| | | |
|---|---|---|
| 2,521,405 | Phelps | Sept. 5, 1950 |
| 2,607,896 | Chambers | Aug. 19, 1952 |
| 2,916,706 | Timperman | Dec. 8, 1959 |